(12) United States Patent
Wakasa et al.

(10) Patent No.: US 9,973,948 B2
(45) Date of Patent: May 15, 2018

(54) MOBILE TERMINAL TESTING APPARATUS AND CELL USE METHOD FOR USE IN THE SAME

(71) Applicant: ANRITSU CORPORATION, Kanagawa (JP)

(72) Inventors: Satoshi Wakasa, Kanagawa (JP); Keiichiro Samejima, Kanagawa (JP); Takayuki Koguchi, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 171 days.

(21) Appl. No.: 14/949,973

(22) Filed: Nov. 24, 2015

(65) Prior Publication Data
US 2016/0277949 A1 Sep. 22, 2016

(30) Foreign Application Priority Data
Mar. 17, 2015 (JP) .................... 2015-053490

(51) Int. Cl.
*H04W 24/06* (2009.01)
*H04W 36/08* (2009.01)
*H04W 36/00* (2009.01)

(52) U.S. Cl.
CPC ....... *H04W 24/06* (2013.01); *H04W 36/0016* (2013.01); *H04W 36/0088* (2013.01); *H04W 36/08* (2013.01)

(58) Field of Classification Search
CPC ............ H04W 24/06; H04W 36/0016; H04W 36/0088
See application file for complete search history.

(56) References Cited

U.S. PATENT DOCUMENTS

| 7,742,449 B2* | 6/2010 | Matsuki | H04W 24/00 370/331 |
| 8,185,116 B2* | 5/2012 | Wu | H04W 36/0088 455/436 |
| 2004/0192214 A1* | 9/2004 | Tanaka | H04W 24/00 455/67.11 |
| 2006/0039326 A1* | 2/2006 | Jeong | H04W 36/0055 370/329 |

(Continued)

FOREIGN PATENT DOCUMENTS

| JP | 2012-080154 A | 4/2012 |
| JP | 2014-216727 A | 11/2014 |

*Primary Examiner* — Noel R Beharry
*Assistant Examiner* — Rodrick Mak
(74) *Attorney, Agent, or Firm* — Pearne & Gordon LLP

(57) ABSTRACT

The mobile terminal testing apparatus including: a cell state determination unit 16 that determines in-use states of multiple cells which perform communication with a mobile communication terminal 2; a cell state change processing unit 17 that changes states of the multiple cells and notifies the cell state determination unit 16 of the states of the multiple cells; and a scenario processing unit 15 that detects the number of cells that need to be added and the number of cells that are available for deletion, based on a message that is transmitted and received between the mobile terminal testing apparatus and the mobile communication terminal 2, and that causes the cell state change processing unit 17 to perform initialization of a cell that is available for deletion, and sets the cell to be available for re-use.

9 Claims, 4 Drawing Sheets

(56) References Cited

U.S. PATENT DOCUMENTS

| | | | |
|---|---|---|---|
| 2009/0069008 A1* | 3/2009 | Highsmith | H04B 1/7143 |
| | | | 455/424 |
| 2010/0273504 A1* | 10/2010 | Bull | G01S 5/02 |
| | | | 455/456.1 |
| 2014/0323059 A1 | 10/2014 | Wakasa et al. | |
| 2015/0312825 A1* | 10/2015 | Hoglund | H04W 36/18 |
| | | | 370/331 |
| 2015/0358882 A1* | 12/2015 | Liu | H04W 36/18 |
| | | | 370/331 |

* cited by examiner

MOBILE TERMINAL TESTING APPARATUS AND CELL USE METHOD FOR USE IN THE SAME

TECHNICAL FIELD

The present invention relates to a mobile terminal testing apparatus that performs communication between the mobile terminal testing apparatus and a mobile communication terminal in order to perform testing of the mobile communication terminal.

BACKGROUND ART

A mobile terminal testing apparatus for performing testing to determine whether or not a mobile communication terminal performs communication normally in accordance with communication standards, in developing the mobile communication terminal such as a portable telephone or a data communication terminal. A operational sequence in which the mobile terminal testing apparatus is configured to operate, or a communication sequence in which a signal is set that is transmitted and received between the mobile terminal testing apparatus and the mobile communication terminal is created in advance as a testing scenario, and is stored in the mobile terminal testing apparatus. The mobile terminal testing apparatus operates as one or more pseudo-base station according to the testing scenario, communicates with the mobile communication terminal that is a testing target, and performs the testing.

The testing that is configured by the testing scenario widely ranges from testing, such as protocol testing, in which only one pseudo-base station is used, to testing in which multiple pseudo-base stations are used at the same time, for example, such as handover testing or measurement testing in which signal quality of a neighboring pseudo-base station and the like are measured. The mobile terminal testing apparatus also needs to operate as multiple pseudo-base stations according to the testing scenario.

In recent years, with improvements in communication rate, a scheme in which communication is performed using multiple communication bands (hereinafter referred to a "cell") at the same time, for example, carrier aggregation or dual connectivity in Long Term Evolution-Advanced (LTE-A), has been standardized. It is stipulated that at most five cells in each of the carrier aggregation and the dual connectivity are available, for use, to one mobile communication terminal.

Patent Document 1 discloses that, in a mobile terminal testing apparatus that performs communication testing which uses multiple cells, a state of a cell that is used by the mobile terminal testing apparatus is displayed.

RELATED ART DOCUMENT

Patent Document

[Patent Document 1] US Unexamined Patent Application Publication No. 2014/0323059

DISCLOSURE OF THE INVENTION

Problem that the Invention is to Solve

A mobile communication terminal in the related art performs communication with a base station with one cell, but in the communication scheme described above, a mobile communication terminal performs the communication with the base station using multiple cells. For this reason, in the mobile terminal testing apparatus that tests the mobile communication terminal in accordance with the communication scheme described above, a configuration in which communication is possible with as many cells as possible is needed. However, because one mobile communication terminal performs the communication using multiple cells, in a case where testing such as a handover is performed, more than two times as many cells as in a normal case are needed, and, in terms of mounting, it is very difficult to increase the number of cells according to the number of cells that are necessary for testing.

Therefore, an object of the present invention is to provide a mobile terminal testing apparatus capable of supporting various types of testing although a maximum number of cells that are used for the testing are not prepared.

Means for Solving the Problem

According to the present invention, there is provided a mobile terminal testing apparatus that simulates a base station for mobile communication in order to test a mobile communication terminal, the apparatus including: a cell state determination unit that determines in-use states of multiple cells which perform communication with the mobile communication terminal; a cell state change processing unit that changes states of the multiple cells and notifies the cell state determination unit of the states of the multiple cells; and a scenario processing unit that detects the number of cells that need to be added and the number of cells that are available for deletion, based on a message that is transmitted and received between the mobile terminal testing apparatus and the mobile communication terminal, and that causes the cell state change processing unit to perform initialization of a cell that is available for deletion, and sets the cell to be available for re-use.

With this configuration, the cell that is available for deletion is initialized and is re-used. For this reason, various types of testing can be supported although a maximum number of cells that are used for the testing are not prepared.

In the mobile terminal testing apparatus of the present invention, when it is detected that the cells need to be added, in a case where the number of cells that need to be added is greater than the number of cells that are available for use, if the number of cells that are available for deletion is equal to or greater than the number of cells that are insufficient, the scenario processing unit may cause the cell state change processing unit to perform the initialization of the cell that is available for deletion, for use as a cell that is added.

With this configuration, when the number of cells that are available for use is smaller than the number of cells that need to be added, the cells that are available for deletion are initialized and are re-used. For this reason, various types of testing can be supported although a maximum number of cells that are used for the testing are not prepared.

Furthermore, the mobile terminal testing apparatus of the present invention may further include: a display unit, in which, when it is detected that the cells need to be added, in the case where the number of cells that need to be added is greater than the number of cells that are available for use, if the number of cells that are available for deletion is smaller than the number of cells that are insufficient, the scenario processing unit displays an error message on the display unit.

Furthermore, in the mobile terminal testing apparatus of the present invention, the scenario processing unit may detect the number of cells that need to be added and the number of cells that are available for deletion, based on a message requesting that a handover is performed.

With this configuration, the cell that is not used in the handover is initialized and is re-used. For this reason, various types of testing can be supported although a maximum number of cells that are used for the testing are not prepared.

Furthermore, in the mobile terminal testing apparatus of the present invention, the mobile terminal testing apparatus may be configured in such a manner that testing in compliance with a communication scheme in which the multiple cells are used at the same time is able to be performed.

With this configuration, in the communication in which the multiple cells are used at the same time, the cell that is not used is initialized and is re-used. For this reason, in the testing in compliance with the communication scheme, in which the multiple cells are needed and in which the multiple cells are used at the same time, various types of testing can be supported although a maximum number of cells that are used for the testing are not prepared.

Furthermore, according to the present invention, there is provided a cell use method for use in a mobile terminal testing apparatus that simulates a base station for mobile communication in order to test a mobile communication terminal, the cell use method including: detecting the number of cells that need to be added and that performs communication with the mobile communication terminal and the number of cells that are available for deletion, based on a message that is transmitted and received between the mobile terminal testing apparatus and the mobile communication terminal; and performing initialization of a cell that is available for deletion, and sets the cell to be available for re-use.

Furthermore, the cell use method according to the present invention may further perform initialization of the cell that is available for deletion and setting the cell to be available for re-use, if the number of cells that are available for deletion is equal to or greater than the number of cells that are insufficient in a case where the number of cells that need to be added is greater than the number of cells that are available for use.

Furthermore, the cell use method according to the present invention may further include displaying an error message if the number of cells that are available for deletion is smaller than the number of cells that are insufficient in the case where the number of cells that need to be added is greater than the number of cells that are available for use.

Furthermore, the cell use method according to the present invention may further include: detecting the number of cells that need to be added and the number of cells that are available for deletion, based on a message requesting that a handover is performed.

With this configuration, the cell that is available for deletion is initialized and is re-used. For this reason, various types of testing can be supported although a maximum number of cells that are used for the testing are not prepared.

Advantage of the Invention

According to the present invention, a mobile terminal testing apparatus can be provided that is capable of supporting various types of testing although a maximum number of cells that are used for the testing are not prepared.

BEST MODE FOR CARRYING OUT THE INVENTION

Figure 1:
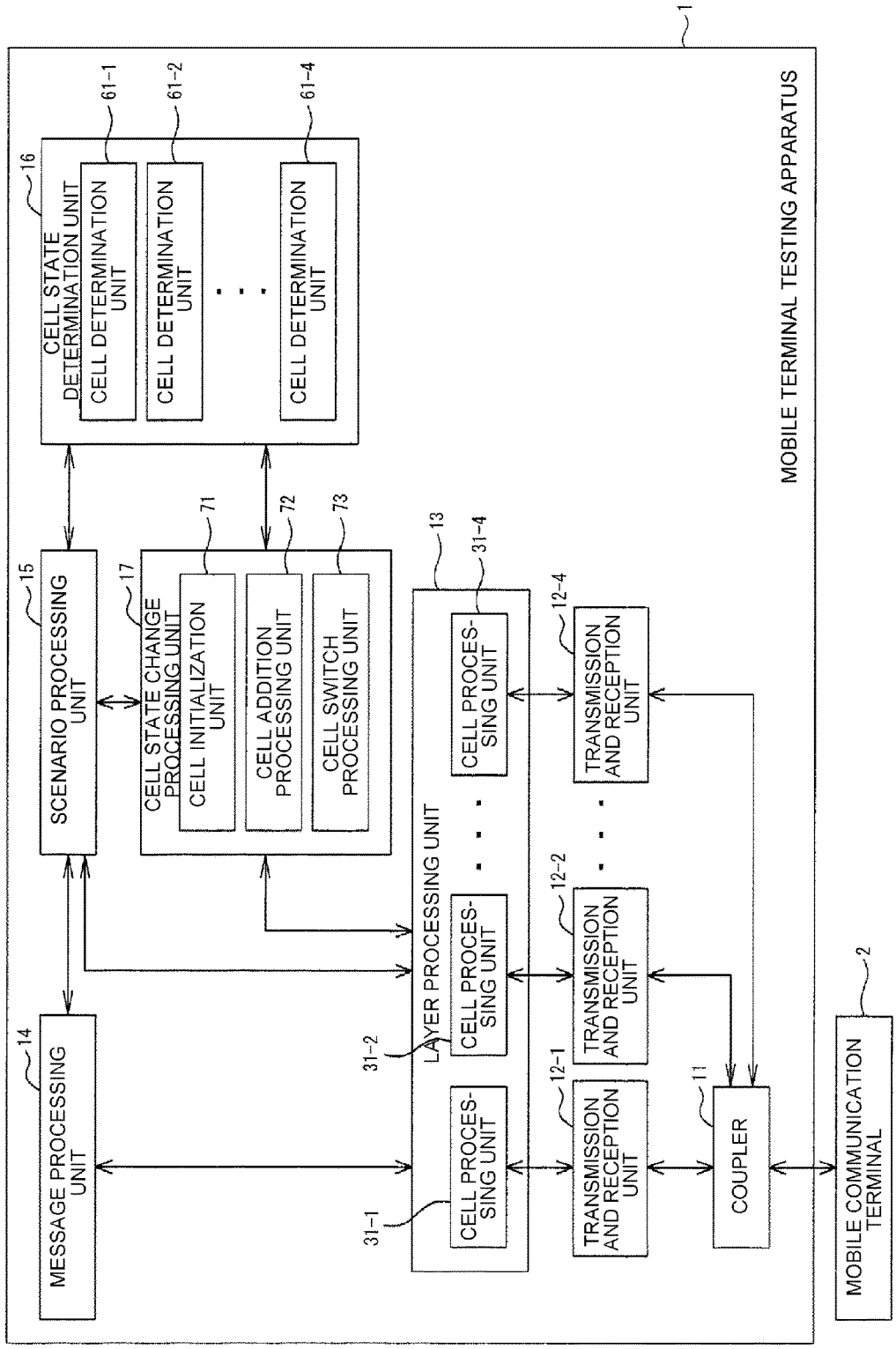
FIG. 1 is a block diagram of a mobile terminal testing apparatus according to an embodiment of the present invention.

Embodiments of the present invention will be described in detail referring to the drawing.

In FIG. 1, a mobile terminal testing apparatus 1 according to one embodiment of the present invention is set to transmit and receive a radio signal to and from a mobile communication terminal 2 in a wired manner through a coaxial cable or the like, as a pseudo-base station. Moreover, the mobile terminal testing apparatus 1 may be set to transmit and receive a signal to and from the mobile communication terminal 2 in a wireless manner through an antenna. The mobile terminal testing apparatus supports LTE-A standards, and is enabled to perform communication between the mobile terminal testing apparatus 1 and the mobile communication terminal 2, using a carrier aggregation technology.

The mobile terminal testing apparatus 1 is configured to include a coupler 11, multiple transmission and reception units 12-1 to 12-4, a layer processing unit 13, a message processing unit 14, a scenario processing unit 15, a cell state determination unit 16, and a cell state change processing unit 17.

The coupler 11 is a circuit element that connects to the mobile communication terminal 2 that is a testing target and the transmission and reception units 12-1 to 12-4. The coupler 11 combines radio signals that are transmitted by the transmission and reception units 12-1 to 12-4 and transmits a result that results from the combination to the mobile communication terminal 2. Furthermore, the coupler 11 transmits to each of the transmission and reception units 12-1 to 12-4 a signal that is received from the mobile communication terminal 2.

The transmission and reception units 12-1 to 12-4 each generate a transmission signal in a baseband from an output signal of the layer processing unit 13, frequency-converts the generated transmission signal into a signal in radio frequency (RF) band, power-amplifies a signal that results from the frequency-conversion, and transmits a signal that results from the power amplification to the mobile communication terminal 2 through the coupler 11. Furthermore, the transmission and reception units 12-1 to 12-4 each frequency-converts the signal in the RF band, which is transmitted from the mobile communication terminal 2 and is received through the coupler 11, into a signal in the base band, acquires the signal in the base band as a reception signal, and outputs the required signal to the layer processing unit 13. According to the present embodiment, an example is described in which the four transmission and reception units 12-1 to 12-4 are provided in such a manner that communication is possible among at most four cells.

The layer processing unit 13 performs signal processing that is based on a predetermined communication protocol and performs processing of each layer in compliance with a communication protocol for a layer configuration that has multiple layers. The layer processing unit 13 has multiple cell processing units 31-1 to 31-4.

The cell processing units 31-1 to 31-4 transmit and receive a wireless signal between the mobile terminal testing apparatus 1 and the mobile communication terminal 2 through the transmission and reception units 12-1 to 12-4, respectively, and perform call control as one cell.

The message processing unit 14 transmits and receives a call control message between the mobile terminal testing apparatus 1 and the mobile communication terminal 2, and performs communication with the mobile communication terminal 2 according to a testing scenario. According to an instruction that is based on the testing scenario from the scenario processing unit 15, the message processing unit 14 creates a message that is to be transmitted to the mobile communication terminal 2, and outputs the created message to the layer processing unit 13. Furthermore, the message processing unit 14 outputs the message that is received from the mobile communication terminal 2 through the layer processing unit 13, to the scenario processing unit 15.

The scenario processing unit 15 retains the testing scenario in which procedures for configuration and testing of the mobile terminal testing apparatus 1 are described, and controls each unit of the apparatus in order to perform each procedure according to the testing scenario.

The cell state determination unit 16 manages a state of a cell that is physically available for use in the mobile terminal testing apparatus 1 and determines whether or not the cell is in use for testing. The cell state determination unit 16 has multiple cell determination units 61-1 to 61-4.

The cell determination units 61-1 to 61-4 manage whether or not cells that correspond to the cell determination units 61-1 to 61-4 themselves, respectively, are in use. The cell determination units 61-1 to 61-4 reply to an inquiry from the scenario processing unit 15 with information on whether or not the cell is in use. Furthermore, with a notification from the cell state change processing unit 17, the cell determination units 61-1 to 61-4 change an in-use state of a cell.

With an instruction from the scenario processing unit 15, the cell state change processing unit 17 instructs the layer processing unit 13 to perform a cell initialization, a cell addition, or a cell switch. In the cell initialization, a cell is set to be returned to an initial state where the cell is not in use and thus to be in a not-in-use state. In the cell addition, with parameters that are set in advance, an initialized cell in the not-in-use state is set to be in the in-use state. In the cell switch, the cell addition is set to be performed after the cell initialization.

Furthermore, the cell state change processing unit 17 changes a state of a cell that is managed by the cell state determination unit 16, based on cell processing, which, according to the instruction from the scenario processing unit 15, is performed on the layer processing unit 13. The cell state change processing unit 17, for example, transmits to the cell state determination unit 16 a signal including a number of a cell whose state is changed and information indicating a post-change state, and thus changes a state of the cell. The cell state determination unit 16 changes a state of the cell based on the received signal.

The cell state change processing unit 17 includes a cell initialization unit 71, a cell addition processing unit 72, and a cell switch processing unit 73.

The cell initialization unit 71 issues an instruction to the layer processing unit 13 in such a manner that a cell that is available for initialization is initialized, based on the instruction from the scenario processing unit 15, and transmits a signal to the cell state determination unit 16 in such a manner that a state of the cell is set to be the not-in-use state.

The cell addition processing unit 72 issues an instruction to the layer processing unit 13 in such a manner that a cell that needs to be added is set to be in the in-use state with parameters that are set in advance, based on the instruction from the scenario processing unit 15, and transmits a signal to the cell state determination unit 16 in such a manner that the state of the cell is set to be the in-use state.

The cell switch processing unit 73 issues an instruction to the layer processing unit 13 in such a manner that a cell that is available for switch is set to be initialized and to be in the in-use state with parameters that are set in advance, based on the instruction from the scenario processing unit 15, and transmits a signal to the cell state determination unit 16 in such a manner that the state of the cell is set to be the in-use state.

Here, the mobile terminal testing apparatus 1 is configured as a computer to which a communication module for performing communication with the mobile communication terminal 2 is provided and which is not illustrated. The computer has a central processing unit (CPU), a read only memory (ROM), a random access memory (RAM), a hard disk drive, an input and output port, and a touch panel, all of which are not illustrated.

Stored in the ROM and the hard disk drive of the computer is a program for causing the computer to function as the mobile terminal testing apparatus 1. That is, the computer functions as the mobile terminal testing apparatus 1 by the CPU executing the program that is stored in the ROM with the RAM as a working area.

In this manner, according to the present invention, the message processing unit 14, the scenario processing unit 15, the cell state determination unit 16, and the cell state change processing unit 17 are configured as the CPU, and the transmission and reception units 12-1 to 12-4 and the layer processing unit 13 are configured as the communication module.

In a case where testing of the mobile communication terminal 2 is performed with the mobile terminal testing apparatus 1 that has such a configuration, first, the testing scenario that is used for testing is created by a user. The creation of the testing scenario may be performed by a different apparatus. By user operating a touch panel, for example, by displaying a testing scenario creation screen on the touch panel, information on a cell that simulates, a sequence that the user wants to perform, or the like is set in the cell processing units 31-1 to 31-4.

The user sets various pieces of information for every base station in terms of intended testing. Based on information that is set, the scenario processing unit 15 generates broadcast information, sequence information, or the like, and stores the generated information, as the testing scenario for the pseudo-base station, in a storage device such as a hard disk drive, in a state of being associated with identification information.

Furthermore, in a case where testing is performed in which multiple base stations are used, the user sets in-cell arrangement of the multiple base stations. Based on information on the in-cell arrangement that is set, the scenario processing unit 15 automatically generates neighboring-cell information for broadcast information of a testing scenario for a pseudo-base station that is set to be used, or the like, and stores the generated information, in a state of being associated with the testing scenario for the pseudo-base station that is to be used as a testing scenario for in-cell arrangement and with identification information of the pseudo base station, in a storage device such as a hard disk drive.

Moreover, a testing scenario that is created in a different apparatus is stored in a storage device such as a hard disk drive of the mobile terminal testing apparatus 1 through an external storage medium, in a state of being associated with the identification information.

After such a testing scenario is created, based on the identification information, the user connects the mobile terminal testing apparatus 1 and the mobile communication terminal 2 to each other in a wired manner, and selects the testing scenario for the pseudo-base station that is to be used, or the testing scenario for in-cell arrangement.

The scenario processing unit 15 reads from the storage device the testing scenario that is associated with the identification information of the testing scenario for the pseudo base station that is selected or of the testing scenario for in-cell arrangement, and, based on the testing scenario that is read, notifies the layer processing unit 13 of contents of the broadcast information, transmission information in location registration processing, or the like and causes the layer processing unit 13 to operate as a pseudo-base station.

After the testing scenario for the pseudo-base station that is to be used is selected, the user performs location registration, such as powering-on of the mobile communication terminal 2, and checks whether or not the location registration is performed normally at the mobile terminal testing apparatus 1 side.

When, in a state where the location registration is performed, an operation of performing a sequence that is set to be in the testing scenario for the pseudo-base station is performed by user operating the touch panel, based on the designated sequence information, the scenario processing unit 15 causes a wireless signal to be transmitted from the layer processing unit 13 based on the designated sequence information, or causes a wireless signal that is a response to the wireless signal that is received from the mobile communication terminal 2 to be transmitted from the layer processing unit 13.

In the mobile terminal testing apparatus 1, the scenario processing unit 15 initializes a cell that is unnecessary after a sequence such as handover, for example, initializes a cell that is a handover source and increases the number of cells in a pseudo manner by reusing the cell as a new cell, and thus can be set to support various types of testing.

A procedure in a case where a change (a change in cell configuration, handover, or the like) in configuration of the mobile communication terminal 2 is performed is as follows.

1) A message in which configuration after the change in configuration is described by a base station, for example, an RRC connection reconfiguration message or the like in the case of LTE, is transmitted to the mobile communication terminal 2 before the configuration at the base station side is changed.

2) Configuration intended for the mobile communication terminal 2 at the base station side is changed to post-change configuration.

3) A completion message, for example, an RRC connection reconfiguration complete message or the like in the case of LTE is received in a cell with a post-switch configuration from the mobile communication terminal 2.

With this procedure in mind, based on a message that is transmitted and received between the mobile terminal testing apparatus 1 and the mobile communication terminal 2, the scenario processing unit 15 detects the number of cells that needs to be added newly or the number of cells that are not used and thus are unnecessary.

Specifically, while the sequence that is set to be in the scenario is being performed, the scenario processing unit 15 monitors messages that are transmitted and received between the mobile terminal testing apparatus 1 and the mobile communication terminal 2, and determines whether or not the cell addition occurs, based on the messages that are transmitted and received.

In a case where it is determined that the cell addition occurs, the scenario processing unit 15 acquires a state of each cell from the cell state determination unit 16, and if the number of cells in the not-in-use state is equal to or greater than the number of cells that need to be added, instructs the cell state change processing unit 17 to add as many cells as necessary. The cell state change processing unit 17 that receives the instruction to add a cell issues an instruction to the layer processing unit 13 in such a manner that the cell that needs to be added is set to be in the in-use state with parameters that are set in the testing scenario, and transmits a signal to the cell state determination unit 16 in such a manner that a state of the cell is set to be the in-use state.

On the other hand, in a case where the number of cells in the not-in-use state is smaller than the number of cells that need to be added, if a sum of the number of deletable cells that are not in use and the number of cells in the not-in-use state is equal to or greater than the number of cells that need to be added, the scenario processing unit 15 instructs the cell state change processing unit 17 to add the cell in the not-in-use state and switch the deletable cell. The cell state change processing unit 17 that is instructed to add the cell and switch the deletable cell issues an instruction to the layer processing unit 13 in such a manner that the cell that is to be added is set to be in the in-use state with the parameters that are set in the testing scenario, issues an instruction in such a manner that the cell that is to be switched is set to be in the in-use state with parameters that are set in the testing scenario after initialization, and transmits a signal to the cell state determination unit 16 in such a manner that a state of the cell is set to be the in-use state.

On the other hand, in a case where the sum of the number of deletable cells that are not in use and the number of cells in the not-in-use state is smaller than the number of cells that need to be added, the scenario processing unit 15 notifies the user that an error occurs, by displaying an error message on the touch panel and so forth.

Figure 2:
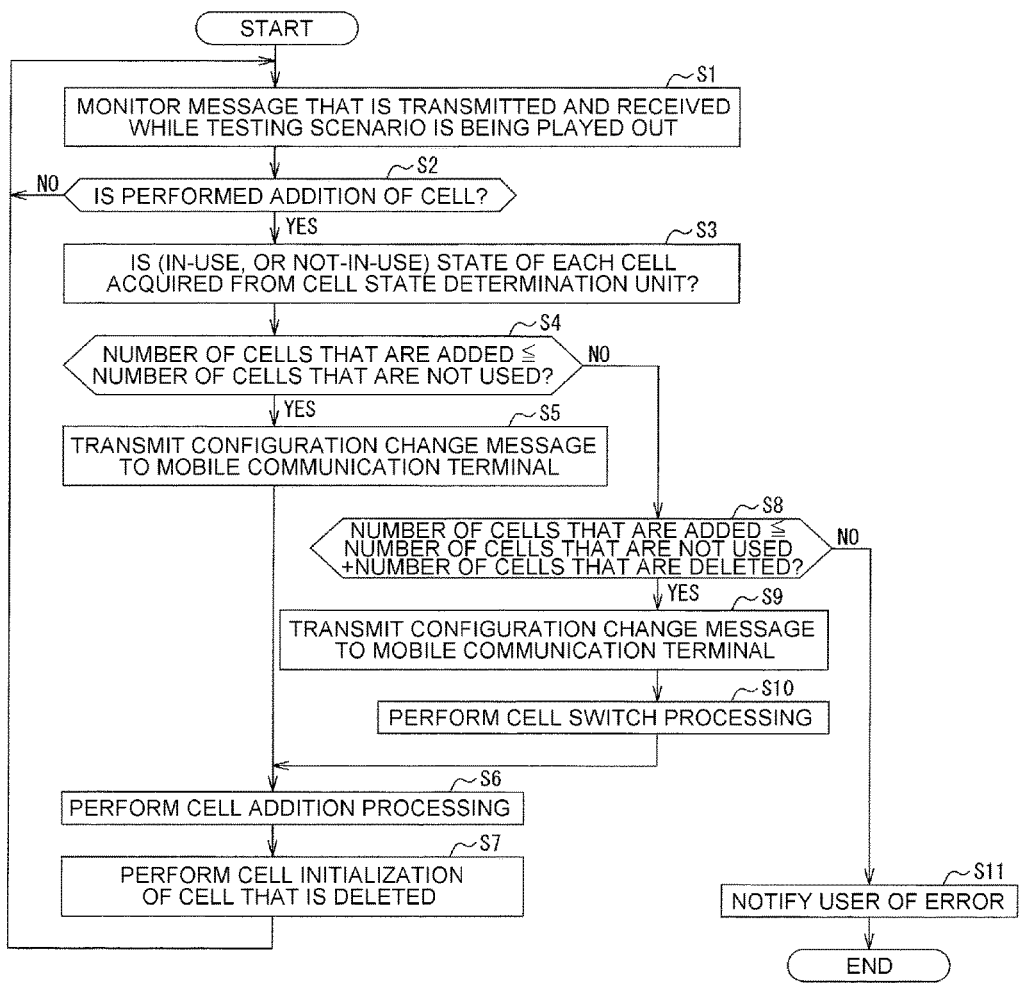
FIG. 2 is a flowchart for describing a procedure for cell addition processing in the mobile terminal testing apparatus according to the embodiment of the present invention.

Cell addition processing by the mobile terminal testing apparatus 1 according to the present embodiment with this configuration is described referring to FIG. 2. Moreover, the cell addition processing that will be described below starts when the testing scenario starts to be played out.

First, the scenario processing unit 15 monitors the transmission and reception message while the testing scenario is being played out (Step S1) and determines whether or not a cell is added, from the transmission and reception messages (Step S2). In a case where it is determined that the cell is not added, the scenario processing unit 15 returns to Step S1 and repeatedly performs the monitoring.

On the other hand, in a case where it is determined that the cell is added, the scenario processing unit 15 acquires a state of each cell from the cell state determination unit 16 (Step S3), and determines whether or not the number of cells in the not-in-use state is equal to or greater than the number of cells that need to be added (Step S4).

In a case where it is determined that the number of cells in the not-in-use state is equal to or greater than the number of cells that need to be added, the scenario processing unit 15 transmits a configuration change message to the mobile communication terminal 2 (Step S5), performs addition processing of the cell that needs to be added (Step S6), performs cell initialization processing on the deletable cell (Step S7), returns to Step S1, and repeatedly performs the monitoring.

On the other hand, in a case where it is determined that the number of cells in the not-in-use state is neither equal to nor greater than the number of cells that need to be added, the scenario processing unit 15 determines whether or not the sum of the number of deletable cells and the number of cells in the not-in-use cells is equal to or greater than the number of cells that need to be added (Step S8).

In a case where it is determined that the sum of the number of deletable cells and the number of cells in the not-in-use cells is equal to or greater than the number of cells that need to be added, the scenario processing unit transmits the configuration change message to the mobile communication terminal 2 (Step S9), performs switch processing of the deletable cell that needs to be switched (Step S10), proceeds to Step S6, performs the addition processing of the cell in the not-in-use state that needs to be added (Step S6), performs cell the initialization processing on the deletable cell (Step S7), returns to Step S1, and repeatedly performs the monitoring.

On the other hand, in the case where it is determined that the sum of the number of deletable cells and the number of cells in the not-in-use cells is neither equal to nor greater than the number of cells that need to be added, the scenario processing unit 15 notifies the user that an error occurs (Step S11) and ends the processing.

Figure 3:
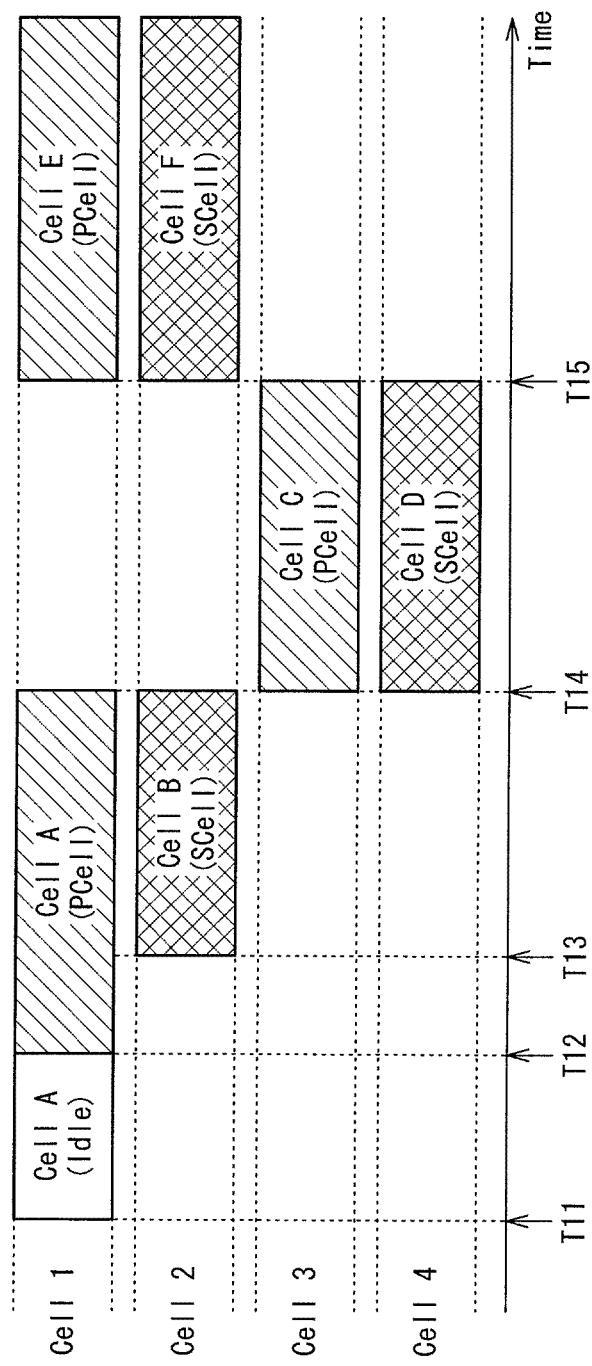
FIG. 3 is a timing chart illustrating a first example of a change in cell use in the procedure for the cell addition processing in the mobile terminal testing apparatus according to the embodiment of the present invention.

An operation that is performed by the cell addition processing will be described referring to FIGS. 3 and 4. FIG. 3 illustrates a case where handover is performed two times in a call that uses two cells and thus 6 cells are used in total. In this case, because a testing apparatus in the related has a configuration in which 4 cells are available for use, cells are insufficient and thus the testing cannot be performed.

According to the present embodiment, the scenario processing unit 15 sets Cell 1 as Cell A at T11, sets Cell A as a primary cell (PCell) at T12, and starts to perform communication between the mobile terminal testing apparatus and the mobile communication terminal 2. Subsequently, at T13, the scenario processing unit 15 sets Cell 2 as Cell B and activates Cell B as a secondary cell (SCell), and starts to perform communication with Cell A and Cell B.

Subsequently, the scenario processing unit 15 detects a message for handover at T14. At this time, because the number of cells (Cell 3 and Cell 4) in the not-in-use state is equal to the number of cells that are added, the scenario processing unit 15 performs the addition processing of Cell 3 and Cell 4 in the not-in-use state and thus causes the handover to be performed with Cell C and Cell D, and performs the initialization processing of cells (Cell 1 and Cell 2) that are unnecessary and thus sets the cells to be in the not-in-use state.

Subsequently, the scenario processing unit 15 detects a message for the second handover at T15. At this time, because the number of cells (Cell 1 and Cell 2) in the not-in-use state is equal to the number of cells that are added, the scenario processing unit 15 performs the addition processing of Cell 1 and Cell 2 in the not-in-use state and thus causes the handover to be performed with Cell E and Cell F, and performs the initialization processing of cells (Cell 3 and Cell 4) that are unnecessary and thus sets the cells to be in the not-in-use state.

In this manner, because a cell that is not in use in the handover and that is the handover source is initialized and thus is in the not-in-use state, the cell can be available for use in the second handover, and the testing in which 6 cells have to be used can be performed with a testing apparatus in which 4 cells are available for use.

Figure 4:
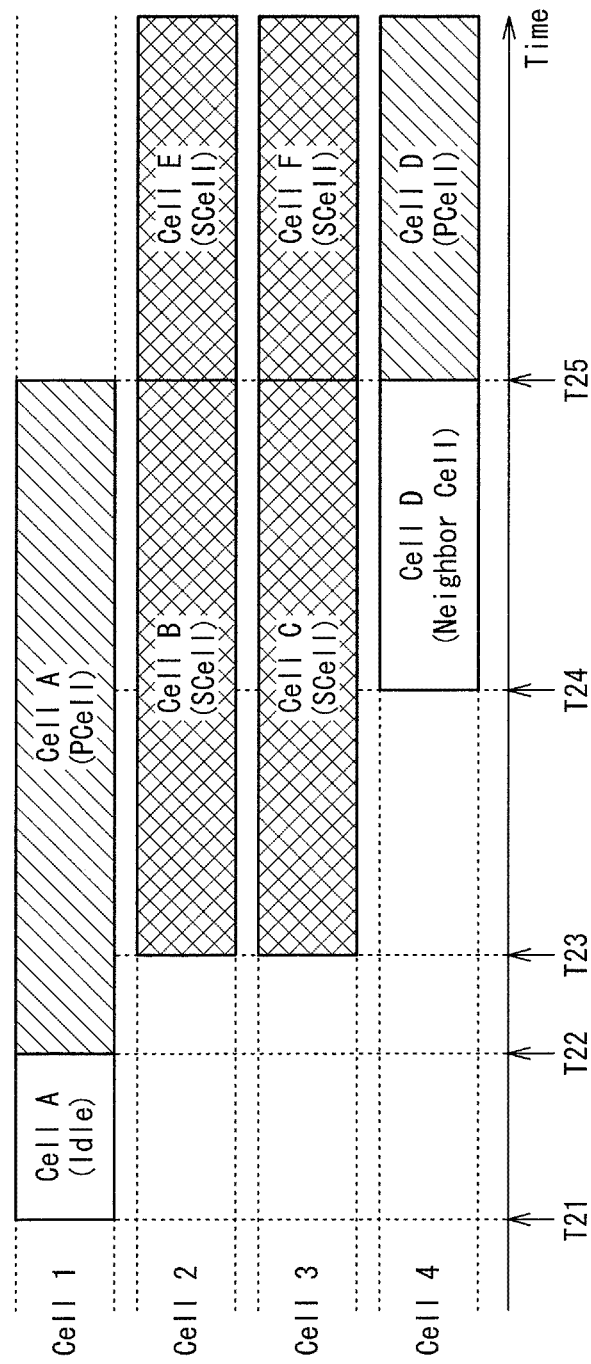
FIG. 4 is a timing chart illustrating a second example of the change in cell use in the procedure for the cell addition processing in the mobile terminal testing apparatus according to the embodiment of the present invention.

Subsequently, FIG. 4 illustrates a case where 6 cells are used in total, in performing testing in which the handover is performed one time in a call that uses 3 cells and one cell among the 3 cells is recognized as a neighboring cell. In this case, because the testing apparatus in the related art has the configuration in which 4 cells are available for use, cells are insufficient and thus the testing cannot be performed.

According to the present embodiment, the scenario processing unit 15 sets Cell 1 as Cell A at T21, sets Cell A as a primary cell at T22, and starts to perform the communication between the mobile terminal testing apparatus and the mobile communication terminal 2. Subsequently, at T23, the scenario processing unit 15 sets Cell 2 as Cell B and activates Cell B as a secondary cell, sets Cell 3 as Cell C and activates Cell C as a secondary cell, and starts to performs the communication with Cell A, Cell B, and Cell C.

Subsequently, at T24, the scenario processing unit sets Cell 4 as Cell D, adds Cell D as a neighboring cell, and causes the mobile communication terminal 2 to recognize this.

Subsequently, at T25, the scenario processing unit 15 detects messages for handovers from Cell A, Cell B, and Cell C to Cell D, Cell E, and Cell F. At this time, because there is no cell in the not-in-use state, the number of cells (Cell 1, Cell 2, and Cell 3) that are not used by the handover is equal to or greater than the number (2) of cells that are added. Thus, the scenario processing unit 15 performs the switch processing of Cell 2 and Cell 3 that are not used and causes the handover to be performed as Cell E and Cell F, and performs the initialization processing of a cell (Cell 1) that is not used and sets the cell (Cell 1) to be in the not-in-use state.

In this manner, because a cell that is not in use in the handover and that is the handover source is switched and thus is used, the cell can be available for use in the handover, and the testing in which 6 cells have to be used can be performed with the testing apparatus in which 4 cells are available for use.

As described above, according to the embodiment described above, the scenario processing unit 15 monitors a message that is transmitted and received between the mobile terminal testing apparatus 1 and the mobile communication terminal 2, detects addition or deletion of a cell with the message, and re-uses the cells that are not used or the cells that are to be deleted, as the cells that need to be added.

Accordingly, although a maximum number of cells that are used in the testing are not prepared, various types of testing can be performed with a mobile terminal testing apparatus that has a configuration in which the number of cells is smaller than the maximum number of cells that are used in the testing.

The embodiment of the present invention is disclosed, and it is apparent to a person of ordinary skill in the related art that modifications to the embodiment are possible within the scope that does not depart from the nature and gist of the present invention. All of these modifications and equivalents are intended to be included in the following claims.

DESCRIPTION OF REFERENCE NUMERALS AND SIGNS

1 MOBILE TERMINAL TESTING APPARATUS
2 MOBILE COMMUNICATION TERMINAL

11 COUPLER
12-1 TO 12-4 TRANSMISSION AND RECEPTION UNIT
13 LAYER PROCESSING UNIT
14 MESSAGE PROCESSING UNIT
15 SCENARIO PROCESSING UNIT
16 CELL STATE DETERMINATION UNIT
17 CELL STATE CHANGE PROCESSING UNIT
61-1 TO 61-4 CELL DETERMINATION UNIT
71 CELL INITIALIZATION UNIT
72 CELL ADDITION PROCESSING UNIT
73 CELL SWITCH PROCESSING UNIT

What is claimed is:

1. A mobile terminal testing apparatus that simulates a base station for mobile communication in order to test a mobile communication terminal, the apparatus comprising:
    a cell state determination unit that determines in-use states of multiple cells which perform communication with the mobile communication terminal;
    a cell state change processing unit that changes states of the multiple cells and notifies the cell state determination unit of the states of the multiple cells;
    a scenario processing unit that:
        detects a number of cells that need to be added for a subsequent communication with the mobile communication terminal, and a number of cells that are available for deletion, based on a message that is transmitted and received between the mobile terminal testing apparatus and the mobile communication terminal,
        causes the cell state change processing unit to initialize a cell that is available for deletion, and
        sets the initialized cell to instead be available for re-use such that the initialized cell set to be available for re-use is re-used in the subsequent communication.

2. The mobile terminal testing apparatus according to claim 1, wherein, when it is detected that the cells need to be added, in a case where the number of cells that need to be added is greater than the number of cells that are available for use, if the number of cells that are available for deletion is equal to or greater than the number of cells that are insufficient, the scenario processing unit causes the cell state change processing unit to perform the initialization of the cell that is available for deletion, for use as cell that is added.

3. The mobile terminal testing apparatus according to claim 1, further comprising:
    a display unit,
    wherein, when it is detected that the cells need to be added, in the case where the number of cells that need to be added is greater than the number of cells that are available for use, if the number of cells that are available for deletion is smaller than the number of cells that are insufficient, the scenario processing unit displays an error message on the display unit.

4. The mobile terminal testing apparatus according to claim 1, wherein, the scenario processing unit detects the number of cells that need to be added and the number of cells that are available for deletion, based on a message requesting that a handover is performed.

5. The mobile terminal testing apparatus according to claim 1, wherein the mobile terminal testing apparatus is configured in such a manner that testing in compliance with a communication scheme in which the multiple cells are used at the same time is able to be performed.

6. A cell use method for use in a mobile terminal testing apparatus that simulates a base station for mobile communication in order to test a mobile communication terminal, the method comprising:
    detecting a number of cells that need to be added for a subsequent communication with the mobile communication terminal, and a number of cells that are available for deletion, based on a message that is transmitted and received between the mobile terminal testing apparatus and the mobile communication terminal;
    performing initialization of a cell that is available for deletion;
    setting the initialized cell to instead be available for re-use; and
    performing the subsequent communication with the initialized cell set to be available for re-use, such that the initialized cell is re-used while performing the subsequent communication.

7. The cell use method according to claim 6, further comprising: performing initialization of the cell that is available for deletion and setting the cell to be available for re-use, if the number of cells that are available for deletion is equal to or greater than the number of cells that are insufficient in a case where the number of cells that need to be added is greater than the number of cells that are available for use.

8. The cell use method according to claim 6, further comprising: displaying an error message if the number of cells that are available for deletion is smaller than the number of cells that are insufficient in the case where the number of cells that need to be added is greater than the number of cells that are available for use.

9. The cell use method according to claim 6, further comprising: detecting the number of cells that need to be added and the number of cells that are available for deletion, based on a message requesting that a handover is performed.

* * * * *